Patented May 7, 1940

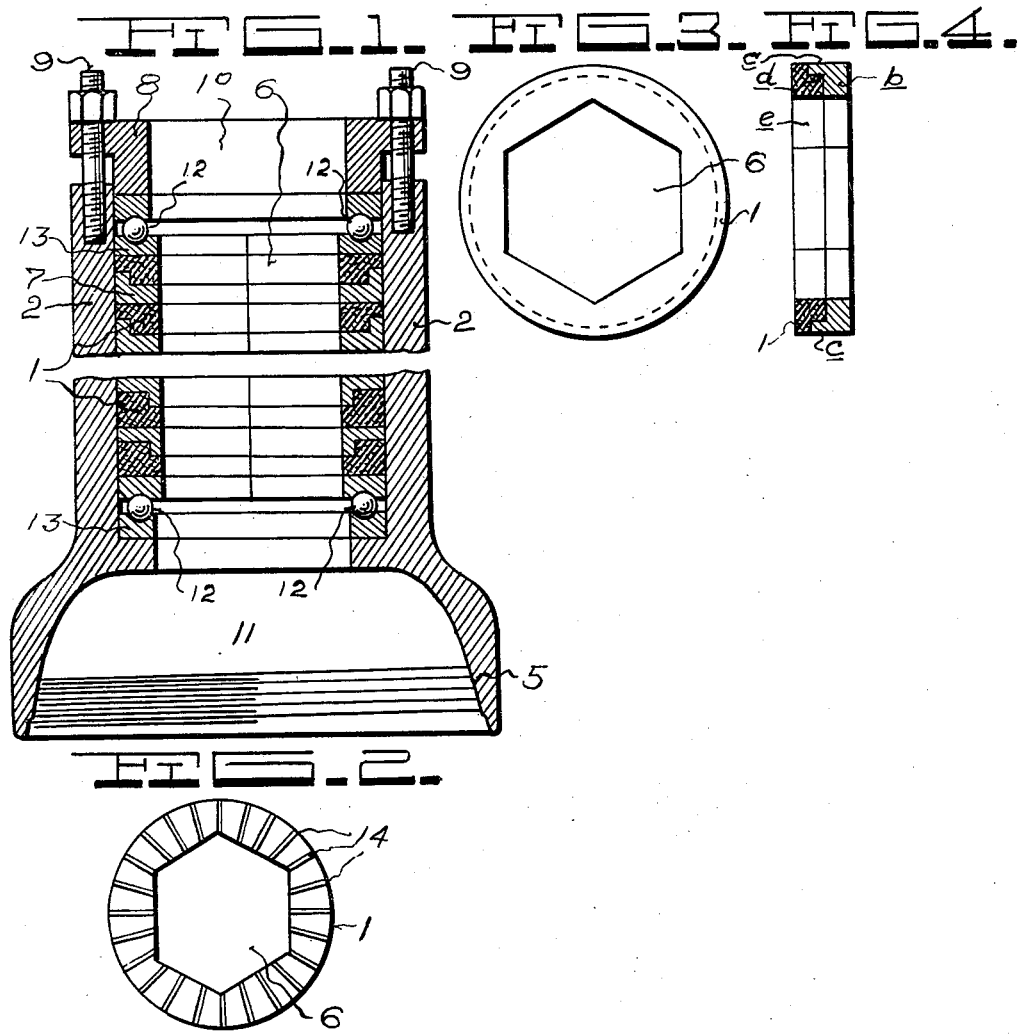

2,199,735

UNITED STATES PATENT OFFICE 2,199,735

PACKING GLAND

Fred G. Beckman, Muskogee, Okla.

Application December 29, 1938, Serial No. 248,291

2 Claims. (Cl. 255—1)

This invention relates to packing or stuffing boxes of the type usually employed in connection with kelly joints or grief stems, and other oil field equipment, and it has particular reference to a novel arrangement and design of packing rings of suitable materials of known quality and composition, and its principal object resides in the provision of a stuffing box construction wherein a laminated series of packing rings are adapted to rotate with the packed member such as a kelly, or grief stem, yet allowing the member to slide longitudinally through the laminated packing.

Another object of the invention resides in the provision of packing material in the form of apertured disks or rings whose outer peripheries are circular and smooth but whose central openings may be any shape conforming in outline to standard cross-sectional configurations of operated bars or shafts, such as a square or hexagonal kelly or a round shaft, and wherein such rings may be composite in structure comprising interlocking sections, each of a different composition, thus presenting a wearing surface around their outer circular faces in contrast to that presented inwardly of the assembly and vice versa.

Still another object of the invention is manifest in the provision of a packing assembly for stuffing boxes wherein the packing material is compressed, forming a seal around the operated member as well as around the packing itself, by bearings of the frictionless type while drive plates or metal disks, being interposed between the rings in laminated arrangement, frictionally cause the assembly to rotate with the operated member.

Broadly, the invention seeks to comprehend the provision of a combination of a packing element for stuffing boxes possessing numerous advantages in its application to operated shafts or rods when both rotary and longitudinal motions are simultaneously imparted to such members.

While the foregoing objects are paramount, other and lesser objects will become manifest as the description proceeds taken in connection with the appended drawing wherein:

Figure 1 is a vertical cross-sectional illustration of the invention.

Figure 2 is a form of drive ring.

Figure 3 is a structure exemplifying the invention showing combination of packing and driving ring.

Figure 4 is a cross-sectional illustration of Figure 3.

Accordingly, therefore, the packing rings are assembled in a stuffing box 2 shown in Figure 1, which is provided with an integral internally threaded bell 5 at its lower end by which the assembly can be secured to the uppermost end of the casing (not shown), as illustrated in Figure 1.

Figure 1 illustrates an assembly of the packing rings 1 having hexagonal central openings 6, the rings 1 being interposed by metal rings 7 of similar form which frictionally engage the faces of the rings 1 when the assembly is compressed by means of the packing gland or follower 8 which is secured in position at the top of the stuffing box 2 by bolts 9 arranged through apertures a in the annular flange of the member 8. Particular attention is called to the peculiar shouldered shape of the metal ring 7 and packing rings 1 for reasons hereinafter explained.

The central opening 10 in the gland 8, as well as the central opening 11 through the bottom of the stuffing box 2, is circular in form and differs from the hexagonal form of the openings 6 in the rings 1 which define a hexagonal bore through the assembly, as illustrated in Figure 1.

The form of the invention illustrated in Figure 1 having the hexagonal opening 6 is designed especially for use in packing off around kelly joints, or drill stems, which are usually either square or hexagonal in cross section. Moreover, a drill stem is operated longitudinally of the stuffing box threaded therein, as previously mentioned, the assembly illustrated in Figure 1 provides a close seal round the outer surface of the operated member (not shown) when arranged through the packing assembly.

Frictionless type bearings 12 are arranged above and below the packing assembly, as illustrated in Figure 2, whose races 13 are arranged nearest and in direct contact with the laminated arrangement of the packing rings 1 and the metal rings 7 affording a frictionless connection between the follower 8 and the compressed packing assembly permitting the latter to rotate within the box 2 although sufficient pressure is applied through the gland 8 to maintain the operative surfaces of the packing rings 1 in engagement with the walls of the box 2 and the surface of the member operating through the assembly.

The metal rings 7 interposed between the packing rings 1, which may be of any suitable material for packing, separate the rings 1 and frictionally engage their faces and serve to unify the assembly to insure the rotation of the entire structure within the box 2. Obviously, when the operated member, such as a rod or shaft, is circular in cross section some of the rings 1 may have a tendency to drag on their outer surface in engagement with the inner walls of the box 2 and fail to rotate therein unless some provision is made to retain each unit in fixed relationship with the adjacent units.

The use of the metal rings 7 may be dispensed with, however, by providing a series of radially directed ribs or grooves 14, according to the individual requirements, impressed into the packing rings 1 in the manner illustrated in Figure 2.

It is highly desirable, under certain circumstances, to provide rings of a composite nature combining interlocking sections of materials of different character, such for example, as metal with fiber. This arrangement is shown in detail in Figures 3 and 4 and illustrated in the assembly exemplified in Figure 1. This structure comprises a sectional ring wherein one of the sections $b$ is provided with an annular ring $c$ which engages an annular peripheral shoulder $d$ of a companion member $e$ which, when the assembly is complete, results in the structure shown in Figures 3 and 4, previously mentioned.

Obviously, if the section $e$ is composed of metal while the companion section $b$ is of a fibrous material the result would be that the section $b$, when compressed, would engage the inner walls of the box 2 providing a seal therearound while the lesser peripheral surface of the section $c$ would not come into direct contact with the walls of the box 2, as illustrated in Figure 1, the metal member $e$ serving only to frictionally engage the face of the section $b$ to insure its unification with the assembly.

When several of the composite rings 1 are employed, as exemplified in Figure 1, it is desirable to arrange a portion of the rings 1 so that the different materials used in these composite structures will be evenly defined as to the outer peripheral surfaces presented to the inner walls of the box 2 and the operating face of the member longitudinally actuated through the bore 6. Thus an arrangement such as that shown in Figure 1 will afford an equal distribution of the fiber surfaces and the metal surface contacting the faces of the members sought to be frictionally engaged by the packing assembly to create a seal therearound.

Manifestly, the structure herein shown and described is capable of some changes and modifications from time to time by those skilled in the art and such changes and modifications as may be resorted to which may be considered within the spirit and intent of the invention may also be considered as falling within the scope of the appended claims.

What is claimed is:

1. In combination with a stuffing box for longitudinally and rotatably operated shafts a housing having a bell shaped open bottom, a circular bore extending through said housing and communicating with the bell shaped bottom, a multiplicity of super-imposed circular dividing rings having shoulders formed in one face thereof, a multiplicity of packing rings having cooperating shoulders in one face thereof disposed between said dividing rings, said packing member and dividing rings arranged to be inserted in the bore of the housing, central openings in the dividing rings and packing members conforming to the outer surface of an operated shaft extending therethrough, a follower removably secured to the extreme upper end of the housing to exert pressure upon said packing members to effect a rotatable seal between the bore of the housing and the operated shaft, and antifrictional bearings disposed in intimate contact with the extreme upper and lower dividing rings whereby the packing members and dividing rings may rotate freely within the housing in coordination with the operated shaft.

2. In combination with a stuffing box for longitudinally and rotatably operated shafts, a housing having a central bore provided with an internal shoulder adjacent to the lower end thereof, extending through said housing, circular superimposed packing rings having dividing rings disposed therebetween arranged to be inserted within said bore to seat on said internal shoulder within the bore, central openings within said rings to conform to the outer surface of an operated shaft extending through said rings whereby said rings engage the shaft, follower means to exert pressure upon said packing rings to effect a seal between said bore and the operated shaft, means for permitting said rings to rotate freely within said bore in coordination with the operated shaft, and cooperating shoulders formed in certain faces of said dividing rings and said packing rings whereby a larger sealing surface is obtained by the packing rings.

FRED G. BECKMAN.